M. A. DEES.
METHOD OF MAKING TIRES.
APPLICATION FILED JAN. 20, 1913.
1,130,964. Patented Mar. 9, 1915.
Fig. I.
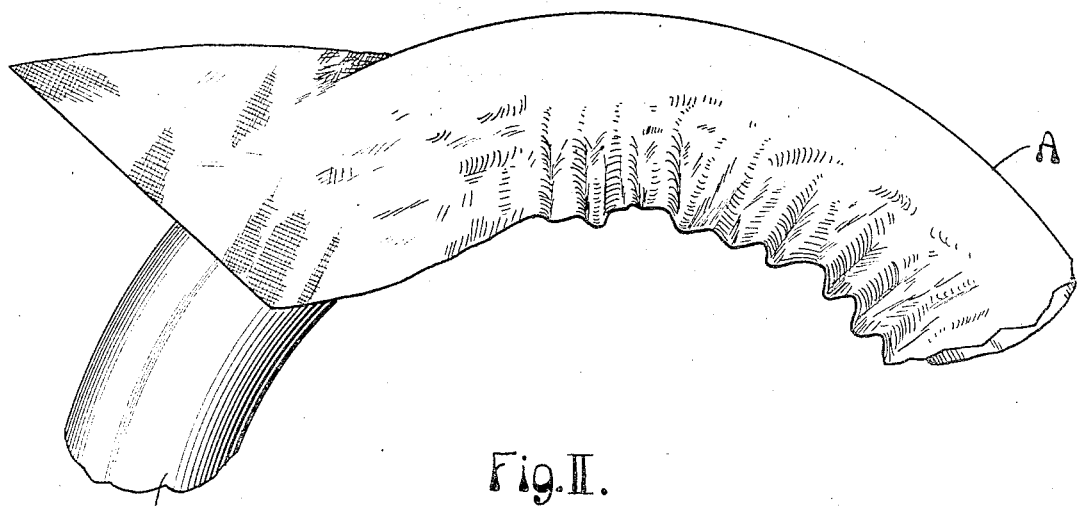
Fig. II.
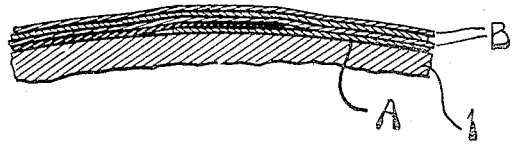
Fig. III.
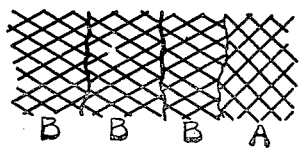
Fig. IV.
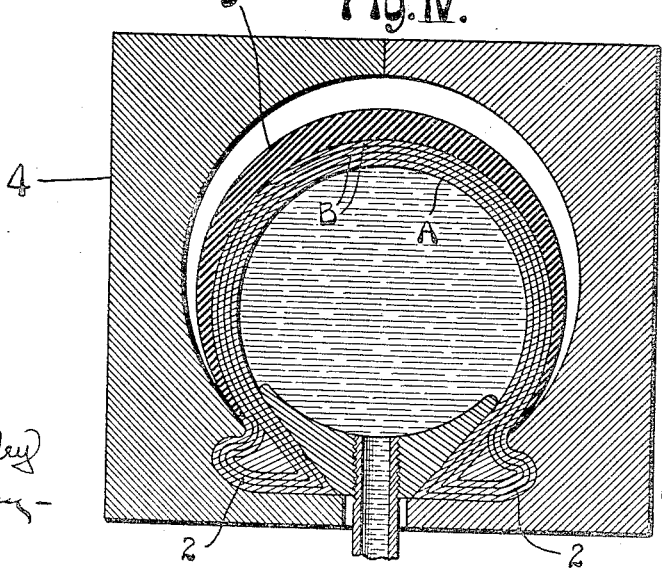
Attest
a.j. McCauley
E. B. ——
Inventor:
M. A. Dees
by Wright & Cook
Att'ys.

UNITED STATES PATENT OFFICE.

MARK A. DEES, OF ST. LOUIS, MISSOURI, ASSIGNOR TO AMERICAN TIRE COMPANY, OF ST. LOUIS, MISSOURI, A CORPORATION.

METHOD OF MAKING TIRES.

1,130,964.     Specification of Letters Patent.     Patented Mar. 9, 1915.

Application filed January 20, 1913. Serial No. 743,115.

*To all whom it may concern:*

Be it known that I, MARK A. DEES, a citizen of the United States of America, and a resident of the city of St. Louis and State of Missouri, have invented certain new and useful Improvements in Methods of Making Tires, of which the following is a full, clear, and exact description, reference being had to the accompanying drawings, forming a part of this specification.

My invention relates to a method of making tires, and is an improvement on the method described in Letters Patent of the United States No. 1,029,307, issued to the American Tire Company, June 11, 1912.

The object of the present invention is the carrying out of a method by virtue of which the tire structures are rendered much stronger and more durable than the tires made in accordance with the method set forth in said Patent No. 1,029,307. In carrying out the patented method, the tire structure, composed of layers of fabric and raw rubber, is usually stretched before vulcanization by the introduction of fluid under pressure into the interior of the tire. The ends of the fabric layers are lapped and stuck together by the raw rubber, and I have discovered that the fluid pressure causes the lapped ends of the inner fabric to slip, thereby permitting the fluid to permeate between the layers of the fabric structure.

Therefore, an object of my invention is to construct the fabric skeleton so that the lapped ends of the inner fabric layer will not slip while the fabric structure is being stretched.

The said patented method provides for the stretching of all of the layers of rubberized fabric in a tire structure when the structure is being laid up, and further stretching of all of such layers in forming the tire, whereby the fabric threads in all of the layers are placed under uniform tension. Experience has shown that in following this procedure, the fluid pressure medium, for example water, in pressing against the inner stretched layer of rubberized fabric, permeates therethrough and gains access between said inner layer and the next adjacent layer of rubberized fabric, with the result of preventing perfect vulcanization of the rubber on the fabric layers, to the serious detriment of the tire structure.

An object of my invention is to so produce a tire structure made, in a general way, in accordance with the method set forth in said patent, as to avoid the permeation of fluid through the inner layer of the tire structure while it is being formed and vulcanized with fluid pressure medium applied internally of the tire structure.

Figure I is a perspective view showing a portion of a mandrel and a layer of fabric stretched slightly at its middle portion to conform to the shape of the periphery of the mandrel, leaving the longitudinal edges of the fabric loose or wrinkled. Fig. II is a section showing a fragment of a mandrel with several layers of fabric thereon. Fig. III is a diagrammatical view of the several layers of fabric. Fig. IV is a transverse section showing the unvulcanized tire structure arranged in a mold, ready to be expanded.

The first step in the patented method herein referred to consists in wrapping strips of fabric, coated and filled with raw rubber, around the periphery of an annular mandrel 1, and at the same time stretching said fabric to cause its middle portion to conform to the shape of the periphery of the mandrel. The loose fabric at the sides of the mandrel is then condensed or contracted by pressure applied by milling tools or other suitable implements adapted to smooth the fabric by adjustment of its threads. The fabric strips employed in tire construction are cut on the bias so that the threads run diagonally of the strips and, as is well known, a number of such strips are required to produce a complete tire skeleton. The adjacent ends of the fabric strips are overlapped and stuck together by the raw rubber. Any desired number of layers of fabric may be wound around the mandrel and each layer is pressed around the sides of the mandrel so as to present a smooth surface conforming to the configuration of the mandrel. No wrinkles are then present in the fabric, all looseness being apparently eliminated by the condensation of the fabric strips at the sides of the mandrel. If the tire is intended to be of the clencher type, the edges of the fabric are provided with or shaped to form beads shown at 2 for holding the tire onto a wheel rim. The fabric is then covered with raw rubber shown at 3 and placed within the vulcanizing mold shown at 4. The next step is the introduction of fluid under pressure into the tire to stretch the fabric, thereby expanding the tire so that the raw rubber engages and is pressed firmly against the inner face of the mold cavity. The degree of pressure for this operation is preferably equal to or greater than the degree of pressure exerted by the inner tube when the tire is in service. The fabric threads are therefore adjusted in the raw rubber to the positions they tend to assume in service, and it must necessarily follow that said threads will not yield in the rubber when subjected to the pressure of the inner tube. The advantages gained by stretching the fabric in this manner are fully described in the patent hereinbefore referred to. After the stretching operation the tire is vulcanized while a high degree of pressure is maintained in the tire.

It will now be understood that the fabric is stretched at two different times, namely, when the fabric strips are wound onto the annular mandrel 1, and by the fluid pressure after the raw tire is placed in the vulcanizing mold. I have found in practice that if all of the fabric strips are stretched to the same degree while being wound onto the mandrel, the second stretching operation caused by the fluid pressure will cause the strip forming the inner fabric layer to slip at the points where the ends of this strip overlap each other. This slippage seems to destroy the connection between ends of the fabric strip, which are usually only united by the raw rubber, and as a consequence the fluid under pressure permeates into the fabric skeleton so as to render it unfit for service. To prevent such leakage, I produce the inner fabric layer A by winding the fabric onto the mandrel under a very slight degree of tension preferably just sufficient for the fabric to be pressed smoothly around the sides of the mandrel. Particular attention is directed to the fact that the inner fabric layer A is not subjected to any great degree of tension while being formed around the mandrel. The strips entering into the structure of other fabric layers B are stretched around the mandrel very tightly in the usual manner. Fig. III illustrates diagrammatically the distinction between the mesh of the inner fabric layer A, which is almost free of tension, and the mesh of the layers B which are pulled very tightly around the periphery of the mandrel.

When the fabric skeleton produced in this manner is stretched by fluid pressure in the vulcanizing mold, all of the fabric layers are subjected to a substantially uniform pressure, but the threads of the inner layer will yield more freely than the already tensioned threads of the outer layers. The overlapping ends of the fabric forming the inner layer will not slip on each other, for the reason that said inner layer will become adjusted freely in response to the fluid pressure, without exerting a severe pull at the overlapping ends. I have found that this comparatively free fabric layer will confine the fluid under pressure within the tire cavity, thereby insuring a very serviceable fabric structure.

The rubberized fabric layer A of my tire structure being initially laid in the structure in an unstretched, or substantially unstretched, condition is capable of yielding outwardly toward the adjacent stretched and severely tensioned layer of rubberized fabric when subjected to fluid pressure applied internally of the tire structure, and the adjustment of said rubberized fabric layer A in an outward direction takes place without the rubber in the mesh of the fabric in said layer being displaced from the fabric mesh. In other words, the rubberized fabric layer A, with the soft and unvulcanized rubber therein, is moved outwardly with the threads of the fabric and the rubber in the mesh of the fabric traveling together, and both the fabric threads and the soft rubber, in the mesh formed by the threads, are compacted under fluid pressure against the stretched layer of rubberized fabric lying next adjacent to the adjustable rubberized fabric layer A, this action occurring without displacement of the soft rubber from the mesh of the fabric layer A. It will now be understood that the rubberized fabric layer A is in the nature of an extensible insulating blanket, which receives the initial force of fluid pressure medium, used for the formation of a tire within a suitable mold or casing. It will be further understood that the fabric and soft rubber in the mesh of the fabric layer A, yielding together under fluid pressure, and the rubber, therefore, remaining in place in the mesh of the fabric, no opportunity is afforded for the pressure fluid permeating through the mesh of the fabric. My method, therefore, differs essentially from the method described in Patent No. 1,029,307, herein mentioned, in the practice of which the innermost layer of rubberized fabric has its threads initially stretched and firmly held, with the result of permitting the rubber in the mesh of the fabric being forced from the mesh, so that the pressure fluid gains access between the rubberized fabric layers, and prevents perfect subsequent vulcanization of the rubber carried by the adjoining layers of rubberized fabric.

While a highly desirable tire structure is produced by tensioning several fabric layers to a substantially uniform degree, I believe it is also very desirable to combine with such structure one or more layers of comparatively free fabric. The tensioned layers of fabric may weaken and wear away more readily by contact with the ground after the rubber tread becomes worn, but a "blowout" cannot occur without rupturing all of the fabric layers. The inner fabric layer made by my method being subjected to a comparatively slight degree of tension in its manufacture, will withstand a greater degree of internal pressure than the outer layers which have been tensioned to resist the inner tube pressure without yielding.

I claim:—

1. The method of making tires which consists in assembling in a tire casing structure, an inner ply of readily extensible rubberized threads, and an outer ply of rubberized threads less extensible than the threads in the inner ply, then expanding said structure, and finally vulcanizing the rubber on said plies.

2. The method of making tires, which consists in building a tire casing structure of layers of fabric and raw rubber; the outer layer or layers being tensioned when put in position, with the fabric in the innermost of said layers left extensible relative to the outer layer or layers, confining said tire casing structure in a suitable case, then expanding said structure to a degree sufficient to stretch the fabric in the layer or layers except the innermost layer to, approximately, the limit of the elasticity of the threads of such outer fabric layer or layers, and vulcanizing said tire casing structure.

3. The method of making tires, which consists in building a tire casing structure of layers of fabric and raw rubber, the fabric in all the layers except the innermost being severely stretched when put in position, with the fabric in the innermost of said layers left extensible relative to the fabric in the outer layer or layers, confining said tire casing structure in a suitable case then expanding said structure to a degree sufficient to stretch the fabric in the layer or layers except the innermost layer to, approximately, the limit of the elasticity of the threads of such outer fabric layer or layers, and vulcanizing said tire casing structure.

4. The method of making tire casings, which consists in building a tire casing structure of layers of fabric and raw rubber, the fabric in all the layers except the innermost being severely stretched when put in position, with the fabric in the innermost of said layers left extensible relative to the fabric in the outer layer or layers, confining said tire casing structure in a suitable case, and stretching the fabric in the layer or layers except the innermost layer to, approximately, the limit of the elasticity of the threads of such fabric by subjecting said tire casing structure to pressure by introducing a pressure medium into the structure, and vulcanizing said casing structure.

5. The method of making tire casings, which consists in building a tire casing structure of layers of fabric and raw rubber, all the layers except the innermost layer being severely stretched when put in position, with the fabric in the innermost of said layers left extensible relative to the fabric in the outer layer or layers, confining said tire casing structure in a suitable case, then placing the threads in the fabric in the outer layer or layers of fabric and raw rubber under uniform tension to, approximately, the limit of elasticity of such threads by pressure applied internally of said tire casing structure, and vulcanizing said structure, whereby the stretched threads in the outermost layer or layers are set in their stretched condition.

6. The method of making tires, which consists in laying a readily extensible ply comprising rubberized threads upon a suitable form, surrounding said first ply with an outer ply or plies of rubberized threads rendered less extensible than the threads in the first ply, confining the structure in a suitable case, expanding the tire structure by the introduction of fluid under pressure thereinto against the inner ply, to adjust it outwardly relative to the outer ply or plies as an insulation blanket serving to prevent contact of fluid with the outer ply or plies, and thereafter vulcanizing the rubber in the tire structure.

7. The method of making tires, which consists in laying a ply comprising rubberized threads in substantially unstretched condition upon a suitable form, surrounding said first ply with an outer ply or plies comprising rubberized threads rendered less extensible than the threads in the first ply, confining the structure in a suitable case, expanding the tire structure by the introduction of fluid under pressure thereinto against the inner ply, to adjust it outwardly relative to the outer ply or plies as an insulation blanket serving to prevent contact of fluid with the outer ply or plies, and thereafter vulcanizing the rubber in the tire structure.

8. The method of making tires, which consists in laying a readily extensible ply comprising rubberized threads upon a suitable form, surrounding said first ply with a plurality of superposing outer plies of rubberized threads, all of said outer plies being tensioned to approximately the same degree and less extensible than the threads in the first ply, confining the structure in a suitable case, expanding the tire structure by the introduction of fluid under pressure thereinto against the inner ply, to adjust it outwardly relative to the outer ply or plies as an insulation blanket serving to prevent contact of fluid with the outer ply or plies, and thereafter vulcanizing the rubber in the tire structure.

MARK A. DEES.

In the presence of—
A. J. McCauley,
E. B. Linn.